(12) United States Patent
Cooling et al.

(10) Patent No.: US 12,149,151 B2
(45) Date of Patent: Nov. 19, 2024

(54) PERMANENT MAGNET GENERATOR BRAKES WITH PRESS SLIP FIT

(71) Applicant: Hamilton Sundstrand Corporation, Charlotte, NC (US)

(72) Inventors: Aaron Cooling, Rockford, IL (US); Glenn C. Lemmers, Jr., Loves Park, IL (US); Andreas C. Koenig, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 117 days.

(21) Appl. No.: 18/105,457

(22) Filed: Feb. 3, 2023

(65) Prior Publication Data

US 2024/0266912 A1    Aug. 8, 2024

(51) Int. Cl.
*H02K 7/102*   (2006.01)
*H02K 7/18*    (2006.01)
*H02K 11/21*   (2016.01)
*H02K 11/26*   (2016.01)

(52) U.S. Cl.
CPC .......... *H02K 7/102* (2013.01); *H02K 7/1823* (2013.01); *H02K 11/21* (2016.01); *H02K 11/26* (2016.01)

(58) Field of Classification Search
CPC ...... H02K 7/102; H02K 7/1823; H02K 11/21; H02K 11/26
USPC ........................................ 318/366, 364, 362
See application file for complete search history.

(56) References Cited

U.S. PATENT DOCUMENTS

| | | | |
|---|---|---|---|
| 10,006,375 B1 * | 6/2018 | Wagner | .................. B64D 31/09 |
| 11,332,256 B2 | 5/2022 | Hon et al. | |
| 2020/0096062 A1 | 3/2020 | Smith | |
| 2020/0099322 A1 | 3/2020 | Smith | |

FOREIGN PATENT DOCUMENTS

| | | |
|---|---|---|
| JP | S49134081 U | 11/1974 |
| JP | S4946024 B1 | 12/1974 |
| JP | S57172935 U | 10/1982 |
| JP | 2020094674 A | 6/2020 |

OTHER PUBLICATIONS

European Search Report dated Jul. 30, 2024 in connection with European Patent Application No. 24155812.1, 86 pages.

* cited by examiner

*Primary Examiner* — David Luo

(57) ABSTRACT

A system includes a permanent magnet generator (PMG) with a generator shaft defining a longitudinal axis. A brake system includes a brake shaft with a first end operatively connected to the generator shaft for selectively rotating with the generator shaft or braking to slow the generator shaft. A shear shaft is operatively connected to a second end of the brake shaft axially opposite the first end along the longitudinal axis. The brake system includes a press fit sleeve engaged about the brake shaft and an actuator. The actuator is operatively connected to actuate a pawl between a first position spaced apart from the press fit sleeve for normal operation of the PMG, and a second position engaged with the press fit sleeve to apply braking forces to the press fit sleeve and to the generator shaft.

18 Claims, 3 Drawing Sheets

PERMANENT MAGNET GENERATOR BRAKES WITH PRESS SLIP FIT

BACKGROUND

1. Field

The present disclosure relates to power generation, and more particularly to brakes for permanent magnet generators (PMGs) such as used with gas turbine engines to generate electrical power.

2. Description of Related Art

Wound field synchronous machine type generators have been used for power generation aboard aircraft with prime mover power input from the aircraft engine, e.g. gas turbine engines. Permanent magnet generators (PMGs) offer various operation advantages over synchronous field generators. However PMGs introduce a novel issue as synchronous machine type generators can simply be de-excited to stop feeding a fault in a very short time.

In a permanent magnet generator, any time the rotor is spinning, a voltage is being applied to the stator. If a short circuit fault occurs in the stator, the fault will continue to be active until the generator is at zero speed. Permanent magnet machines cannot be de-excited, they must be brought to zero speed to stop feeding the fault. This is particularly challenging because PMGs can spin two to five times faster than traditional would field synchronous machines.

The conventional techniques have been considered satisfactory for their intended purpose. However, there is an ever present need for improved systems and methods for PMG braking, e.g. in conjunction with aircraft engines. This disclosure provides a solution for this need.

SUMMARY

A system includes a permanent magnet generator (PMG) with a generator shaft defining a longitudinal axis. A brake system includes a brake shaft with a first end operatively connected to the generator shaft for selectively rotating with the generator shaft or braking to slow the generator shaft. A shear shaft is operatively connected to a second end of the brake shaft axially opposite the first end along the longitudinal axis. The shear shaft is configured for connection to a prime mover for rotation of the generator shaft, and is configured to rotate together with the prime mover and with the brake shaft under normal conditions, and to disconnect the prime mover from the brake shaft if subjected to a predetermined torque differential between the prime mover and the brake shaft. The brake system includes a press fit sleeve engaged about the brake shaft and an actuator. The actuator is operatively connected to actuate a pawl between a first position spaced apart from the press fit sleeve for normal operation of the PMG, and a second position engaged with the press fit sleeve to apply braking forces to the press fit sleeve and to the generator shaft.

The brake shaft can include a drum operatively connected for rotation together with the generator shaft. The press fit sleeve can be press fit to a radially outward surface of the drum with an interference fit. The interference fit can be configured for rotation of the press fit sleeve together with the drum with the pawl in the first position, and for independent rotation of the press fit sleeve with the pawl in the second position, wherein friction between the drum and the press fit sleeve applies the braking forces.

The press fit sleeve can include at least one tooth extending radially outward with respect to the longitudinal axis. The at least one tooth and the pawl can be configured to engage one another to bring the press fit sleeve to a stop with the pawl in the second position so frictional forces between the press fit sleeve and the drum first slow, then bring the drum and the generator shaft to a stop.

The brake system can include a housing and a biasing member biasing between the housing and the pawl for application of actuation forces on the pawl to drive the pawl into the second position. The brake system can include a solenoid with a retract rod. The solenoid can be mounted stationary relative to the housing. In the first position of the pawl, the retract rod can engage the pawl to maintain the pawl in the first position with the biasing member biasing the pawl against the retract rod. Upon retraction of the retract rod by the solenoid, the retract rod can disengage from the pawl, allowing the biasing member to drive the pawl into the second position.

The pawl can pass through and be slidingly engaged with a bore of a housing of the brake system. A link can be pinned to the housing and to an end of the pawl. In the first position the link can be spaced apart from the press fit sleeve. In the second position, and end of the link can engage a radially outward extending tooth of the press fit sleeve to stop rotation of the press fit sleeve. A reset pull ring can be connected to the pawl through the housing wherein the pull ring is configured to allow resetting the pawl to the first position from the second position by pulling the reset pull ring in a direction away from the housing. The PMG can be configured to be driven in a rotational direction. The link and the radially outward extending tooth can be oriented so that the radially outward extending tooth engages flush with the end of the link as the radially outward extending tooth rotates in the rotational direction into engagement with the end of the link.

A gas turbine engine (GTE) can be operatively connected to the shear shaft to drive the PMG as a prime mover. A generator control unit (GCU) can be operatively connected to the PMG for controlling electrical output of the PMG. The GCU can be operatively connected to a solenoid, which can be operatively connected to actuate the pawl based on commands from the GCU.

A sensor can be operatively connected to the GCU to provide feedback for controlling the brake system. The sensor can include a speed sensor operatively connected to provide feedback to the GCU indicative of speed of the generator shaft. The sensor can include a voltage sensor operatively connected to a voltage output of the PMG to generate feedback to the GCU indicative of voltage output of the PMG.

The GCU can be configured to output solenoid current to the solenoid for control of braking of the generator shaft. The GCU can include machine readable instructions configured to cause the GCU to receive input indicative of a fault condition for the PMG, and enter into a braking mode based on the input indicative of the fault condition; and output a command to a solenoid for control of the brake system for applying braking to the generator shaft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
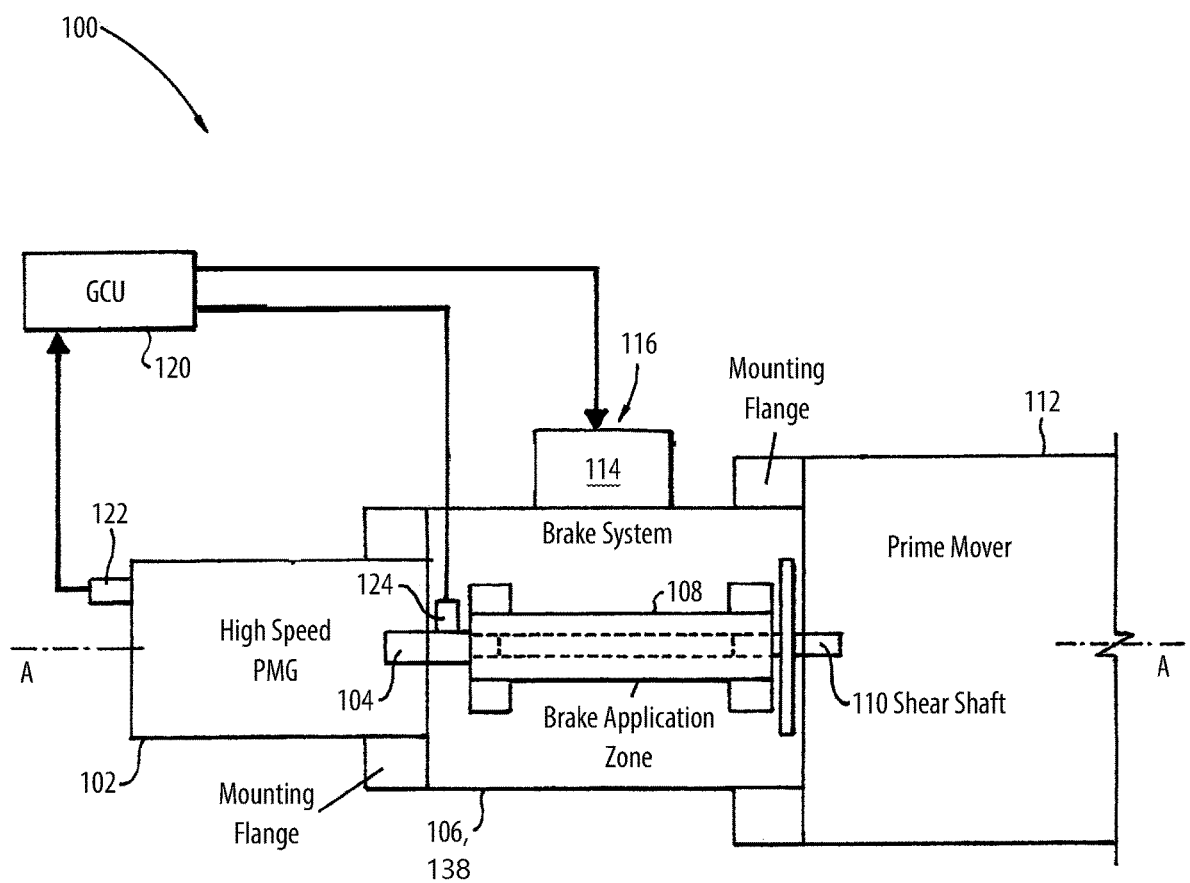
FIG. 1 is a schematic view of an embodiment of a system constructed in accordance with the present disclosure, showing the brake system between the permanent magnet generator (PMG) and the gas turbine engine (GTE)

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to provide braking for electrical fault protection for permanent magnet generator (PGM) systems such as used with aircraft engines and the like.

The system 100 includes a permanent magnet generator (PMG) 102, e.g. a high speed PMG for power generation on an aircraft, with a generator shaft 104 defining a longitudinal axis A. A brake system 106 includes a brake shaft 108 with a first end operatively connected to the generator shaft 104, e.g. with a spline, for selectively rotating with the generator shaft 104 or braking to slow the generator shaft 104.

A shear shaft 110 is operatively connected, e.g. with a spline or the like, to a second end of the brake shaft 108 axially opposite the first end along the longitudinal axis A. The shear shaft 110 is configured for connection to the prime mover 112 for rotation of the generator shaft, and is configured to rotate together with the prime mover and with the brake shaft 108 under normal conditions. The shear shaft 110 is configured to disconnect the prime mover 112 from the brake shaft 108 if subjected a predetermined torque, i.e. when the brake is applied as described below. The shear shaft can include a necking down, frangible structure, burstable structure, or the like, designed to break or burst at the predetermined torque.

With continued reference to FIG. 1, the actuator 116 of the brake system 100 includes a solenoid 114. The prime mover 112 is a gas turbine engine (GTE) that operatively connected to the shear shaft 110 to drive the PMG 102. A generator control unit (GCU) 120 is operatively connected to the PMG 102 for controlling electrical output of the PMG 102. The GCU 120 is operatively connected to the solenoid 114, which is operatively connected to actuate the brake system 106 based on commands from the GCU 120. A sensor 122 is operatively connected to the GCU 120 to provide feedback for controlling the brake system 106. The sensor 122 includes a voltage, current, and/or electrical fault sensor operatively connected to a voltage output of the PMG 102 to generate feedback to the GCU 120 indicative of electrical output of the PMG 102. It is also contemplated that in addition to or in lieu of the sensor 122, a sensor 124 can be a speed sensor operatively connected to provide feedback to the GCU 120 indicative of speed of the generator shaft 104, or the PMG itself can be used as a speed sensor. The GCU 120 is configured to output solenoid current to the solenoid 114 for control of breaking of the generator shaft 104.

With continued reference to FIG. 1, the GCU 120 includes machine readable instructions, e.g. digital code, digital logic components, analog circuitry, and/or the like, configured to cause the GCU 120 to receive input, e.g. from the sensors 122, 124, indicative of an electrical fault condition for the PMG 120, such as a main stator short, and enter into a braking mode based on the input indicative of the electrical fault condition; and output a command, e.g. solenoid current, to the solenoid 114 for control of the brake system 106 for applying braking to the generator shaft 104.

Figure 2:
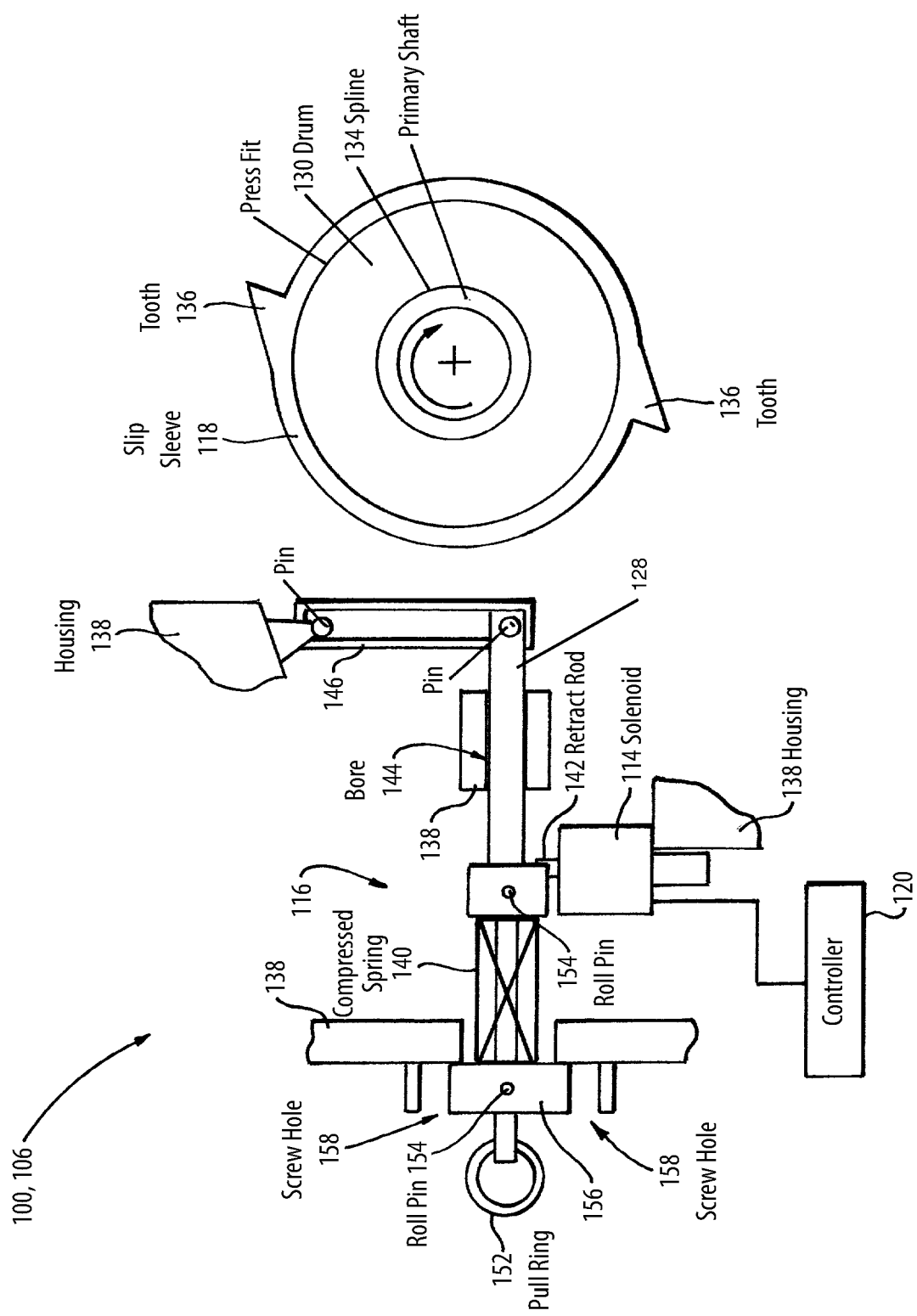
FIG. 2 is a schematic view of the system of FIG. 1, showing the press fit sleeve of the brake system, with the actuator in the first position for normal operation of the PMG.
Figure 3:
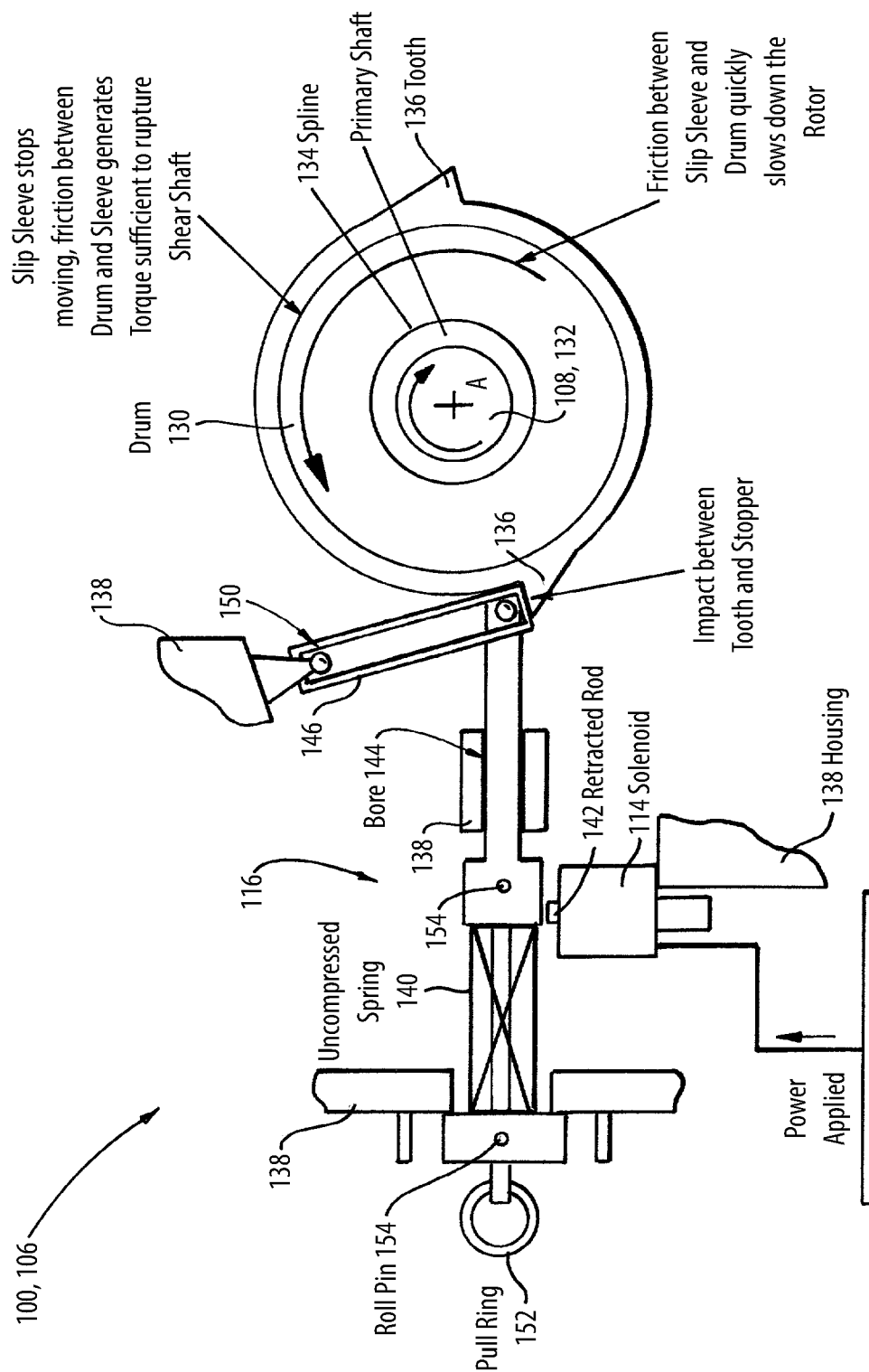
FIG. 3 is a schematic view of the system of FIG. 1, showing the press fit sleeve of the brake system, with the actuator in the second position for braking.

With reference now to FIGS. 2 and 3, the brake system 106 includes a press fit sleeve 118 engaged about the brake shaft 108. The actuator 116 is operatively connected to actuate a pawl 128 between a first position, shown in FIG. 2, spaced apart from the press fit sleeve 118 for normal operation of the PMG 102 (labeled in FIG. 1), and a second position, shown in FIG. 3, engaged with the press fit sleeve 118 to apply braking forces to the press fit sleeve 118 and to the generator shaft 104.

The brake shaft 108 includes a drum 130, which is splined with a spline 134 to a core 132 of the brake shaft 108. It is possible to omit the core 132 of the brake shaft 108 and spline the drum 130 of the brake shaft 108 directly to the generator shaft 104 and to the shear shaft 110, both labeled in FIG. 1. The drum 130 is thus operatively connected for rotation together with the generator shaft 104, labeled in FIG. 1. The press fit sleeve 118 is press fit to a radially outward surface of the drum 130 with an interference fit. The interference fit is configured for rotation of the press fit sleeve 118 together with the drum 130 with the pawl 128 in the first position shown in FIG. 2. The interference fit is also configured for independent rotation of the press fit sleeve 118 with the pawl 128 in the second position, shown in FIG. 3, wherein friction between the drum 130 and the press fit sleeve 118 applies the braking forces.

With continued reference to FIGS. 2-3, the press fit sleeve 118 includes teeth 136 extending radially outward from the main outer surface of the press fit sleeve 118 with respect to the longitudinal axis A. The teeth 136 and the pawl 128 are configured to engage one another to bring the press fit sleeve 118 to a stop with the pawl 128 in the second position, shown in FIG. 3, so frictional forces between the press fit sleeve 118 and the drum 130 first slow, then bring the drum 130 and the generator shaft 104 (labeled in FIG. 1) to a stop.

The brake system 106 includes a housing 138 and a biasing member 140 biasing between the housing 138 and the pawl 128 for application of actuation forces on the pawl 128 to drive the pawl 128 into the second position shown in FIG. 3. The biasing member 140 can be a spring, Belleville washer, compliant mechanism, or the like.

The solenoid 114 includes a retract rod 142. The solenoid 114 is mounted stationary relative to the housing 138. In the first position of the pawl 128 shown in FIG. 2, the retract rod 142 engages the pawl 128 to maintain the pawl 128 in the first position with the biasing member 140 biasing the pawl 128 against the retract rod 142. Upon retraction of the retract rod 142 by the solenoid 114, e.g. when commanded by the GCU 120 due to sensing an overcurrent or main stator short situation, the retract rod 142 retracts and disengages from the pawl 128 as shown in FIG. 3, allowing the biasing member 140 to drive the pawl 128 into the second position.

The pawl 128 passes through and is slidingly engaged with a bore 144 of the housing 138. A link 146 that is pinned to the housing 138 and to an end of the pawl 128, where at least one of the pins 148 has a sliding degree of freedom in addition to rotational freedom of motion, e.g. wherein one of the holes 150 for the pins 148 is elongated along the length of the link 146 as shown in FIG. 3. In the first position shown in FIG. 2, the link 146 is spaced apart from the press fit sleeve 118. In the second position shown in FIG. 3, and end of the link 146 acts as a stopper by engaging a radially outward extending tooth 136 of the press fit sleeve 118 to stop rotation of the press fit sleeve 118.

A reset pull ring 152 is connected to the pawl 128 through the housing, e.g. with roll pins 154 pinning the rest pull ring 152 to an access hatch 156 of the housing 138 and to the pawl 128. The access hatch 152 can be secured to the rest of the housing, e.g. using the bolt or screw holes 158. The pull ring 152 is configured to allow resetting the pawl 128 to the first position, shown in FIG. 2, from the second position, shown in FIG. 3, by pulling the reset pull ring in a direction away from the housing 138, i.e. to the left as oriented in FIG. 3.

The PMG 102, labeled in FIG. 1, is configured to be driven in a rotational direction indicated in FIGS. 2-3 by the small rotation arrow about the longitudinal axis A. The link 146 and the radially outward extending teeth 136 are oriented with respect to that rotational direction so that one of the radially outward extending teeth 136 engages flush with the end of the link 146 as the radially outward extending tooth 136 rotates in the rotational direction, coming into engagement with the end of the link 136. The housing 138 resolves the force of the tooth 136 impacting the link 138.

In the second position shown in FIG. 3, the drum 130 continues to rotate against the frictional force of the stopped press fit sleeve 118. The drum 130 and the press fit sleeve 118 can heat up due to the friction, and so the materials of the drum 130 and press fit sleeve 118 should have similar coefficients of thermal expansion so the materials can expand at the same rate to maintain friction as they heat up. The toque differential across the shear shaft 110 caused by the braking forces is sufficient to rupture or break the shear shaft. The press fit interface slips creating drag torque or braking forces, and the rotor of the PMG 102, labeled in FIG. 1, eventually reaches to zero speed.

The methods and systems of the present disclosure, as described above and shown in the drawings, provide for braking protection for PMG systems such as used with aircraft engines and the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
a permanent magnet generator (PMG) with a generator shaft defining a longitudinal axis;
a brake system, wherein the brake system includes a brake shaft with a first end operatively connected to the generator shaft for selectively rotating with the generator shaft or braking to slow the generator shaft; and
a shear shaft operatively connected to a second end of the brake shaft axially opposite the first end along the longitudinal axis, the shear shaft being configured for connection to a prime mover for rotation of the generator shaft, and being configured to rotate together with the prime mover and with the brake shaft under normal conditions, and to disconnect the prime mover from the brake shaft if subjected to a predetermined torque;
wherein the brake system includes:
a press fit sleeve engaged about the brake shaft; and
an actuator operatively connected to actuate a pawl between a first position spaced apart from the press fit sleeve for normal operation of the PMG, and a second position engaged with the press fit sleeve to apply braking forces to the press fit sleeve and to the generator shaft.

2. The system as recited in claim 1, wherein the brake shaft includes a drum operatively connected for rotation together with the generator shaft, wherein the press fit sleeve is press fit to a radially outward surface of the drum with an interference fit.

3. The system as recited in claim 2, wherein the interference fit is configured for rotation of the press fit sleeve together with the drum with the pawl in the first position, and for independent rotation of the press fit sleeve with the pawl in the second position, wherein friction between the drum and the press fit sleeve applies the braking forces.

4. The system as recited in claim 1, wherein the press fit sleeve includes at least one tooth extending radially outward with respect to the longitudinal axis, wherein the at least one tooth and the pawl are configured to engage one another to bring the press fit sleeve to a stop with the pawl in the second position so frictional forces between the press fit sleeve and the drum first slow, then bring the drum and the generator shaft to a stop.

5. The system as recited in claim 1, wherein the brake system includes:
a housing; and
a biasing member biasing between the housing and the pawl for application of actuation forces on the pawl to drive the pawl into the second position.

6. The system as recited in claim 5, wherein the brake system includes:
a solenoid with a retract rod, wherein the solenoid is mounted stationary relative to the housing, wherein in the first position of the pawl, the retract rod engages the pawl to maintain the pawl in the first position with the biasing member biasing the pawl against the retract rod, and wherein upon retraction of the retract rod by the solenoid, the retract rod disengages from the pawl, allowing the biasing member to drive the pawl into the second position.

7. The system as recited in claim 1, wherein the pawl passes through and is slidingly engaged with a bore of a housing of the brake system.

8. The system as recited in claim 7, further comprising a link pinned to the housing and to an end of the pawl, wherein in the first position the link is spaced apart from the press fit sleeve, and wherein in the second position, an end of the link engages a radially outward extending tooth of the press fit sleeve to stop rotation of the press fit sleeve.

9. The system as recited in claim 8, further comprising a reset pull ring connected to the pawl through the housing wherein the pull ring is configured to allow resetting the pawl to the first position from the second position by pulling the reset pull ring in a direction away from the housing.

10. The system as recited in claim 7, wherein the PMG is configured to be driven in a rotational direction, wherein the link and the radially outward extending tooth are oriented so that the radially outward extending tooth engages flush with the end of the link as the radially outward extending tooth rotates in the rotational direction into engagement with the end of the link.

11. The system as recited in claim 1, further comprising a gas turbine engine (GTE) operatively connected to the shear shaft to drive the PMG as the prime mover.

12. The system as recited in claim 1, further comprising a generator control unit (GCU) operatively connected to the PMG for controlling electrical output of the PMG.

13. The system as recited in claim 12, wherein the GCU is operatively connected to a solenoid, which is operatively connected to actuate the pawl based on commands from the GCU.

14. The system as recited in claim 13, further comprising a sensor operatively connected to the GCU to provide feedback for controlling the brake system.

15. The system as recited in claim 14, wherein the sensor includes a speed sensor operatively connected to provide feedback to the GCU indicative of speed of the generator shaft.

16. The system as recited in claim 14, wherein the sensor includes a voltage sensor operatively connected to a voltage output of the PMG to generate feedback to the GCU indicative of voltage output of the PMG.

17. The system as recited in claim 16, wherein the GCU is configured to output solenoid current to the solenoid for control of braking of the generator shaft.

18. The system as recited in claim 12, wherein the GCU includes machine readable instructions configured to cause the GCU to:
  receive input indicative of a fault condition for the PMG, and enter into a braking mode based on the input indicative of the fault condition; and
  output a command to a solenoid for control of the brake system for applying braking to the generator shaft.

* * * * *